Patented June 18, 1940

2,204,743

UNITED STATES PATENT OFFICE 2,204,743

VINYL RESIN PLASTIC COMPOSITIONS

Victor Yngve, Lakewood, Ohio, assignor to Carbide and Carbon Chemicals Corporation, a corporation of New York No Drawing. Application April 15, 1938, Serial No. 202,215

7 Claims. (Cl. 260—41)

The invention relates to improved vinyl resin plastic compositions, including lacquers, paints and varnishes, as well as those used for molding, calendering, and many other purposes. It is particularly concerned with filler materials for compounding in such compositions, and with a method of pretreating fillers to impart characteristics to them enhancing their value as components of vinyl resin plastics.

Many synthetic resinous products formed by polymerization of vinyl compounds are known to the art and have been suggested for use in various plastic compositions. Among these are the products which may be made by conjoint polymerization of vinyl halides with vinyl esters of lower aliphatic acids. These are resins which are becoming increasingly important in coating compositions and in the plastic art generally. It is with compositions formed with this latter type of vinyl resin as the essential plastic component that the present invention is primarily concerned, including in particular the products of the conjoint polymerization of vinyl chloride with vinyl esters, such as vinyl acetate, propionate, butyrate and formate. The products of the conjoint polymerization of vinyl chloride with vinyl acetate, containing about 60% to 90% of vinyl chloride in the polymer are especially preferred for the purpose of the invention.

The solubility and other inherent characteristics of these resins are such as to require for their compounding into plastic compositions a most careful selecton of solvent and other materials with which they are to be incorporated. In paint and lacquer vehicles or thinner formulae there is usually employed a plurality of components, and a close control of solvent and diluent proportions, and their accurate and proper blending, is essential to obtain the properties desired in a coating composition. These and other factors considerably limit the usefulness in vinyl resin plastics of many known filler and pigment materials, and confine the choice of these to materials having certain specific properties which will give the desired behaviour and effect in the vehicle with which they are to be used. In physical characteristics, commonly known filler materials will vary in properties such as the particle shape, size and color, the opaqueness or translucency of the particle, the impurities which may be contained therein, or the manner in which the filler particle may be wetted by, dispersed in, or adversely affect the vehicle used in compounding the resin. To utilize effectively the advantages of filler materials incorporated with vinyl resins, these many variables must be carefully considered, and extreme precaution is necessary in the selection of a filler to obtain the results desired.

It is an object of this invention to provide a means of treating fillers which will substantially avoid an adverse effect of the filler materials on vinyl resins, and thereby to permit a wider field of use of known filler materials in vinyl resin plastic compositions. A further object is to provide modified and improved fillers capable of imparting to vinyl resins with which they are compounded advantages heretofore unattainable with prior filler and pigmenting substances, and thereby also to provide vinyl resin plastics, including lacquers, paints and the like, of greatly improved properties.

In its broadest concept the invention consists in pretreating the filler prior to incorporating it into the vinyl resin, by applying to the filler particles a film of a lacquer or similar coating composition, the material of the film being one which is substantially insoluble in the vehicle with which the filler and vinyl resin are to be used. The lacquer film may be colorless, or it can contain coloring matter or other agents adapted to produce in the covered filler the modified properties desired. The common vehicles employed with the vinyl resins resulting from the conjoint polymerization of vinyl esters include various ketone and ester solvents and hydrocarbon diluents, and the coating selected for the filler particles should be one which is substantially insoluble in such liquids.

Numerous resinous and other materials heretofore used in coating compositions may comply with these solubility requirements and provide a suitable filler coating. I have found, however, especially suitable, and prefer in this capacity, another type of vinyl resin which may be termed specifically a polyvinyl partial acetal resin. These resins comprise polymeric vinyl bodies in which definite proportions of the functional groups are combined in acetal-type linkage with certain aldehydes, while practically all of the remainder exist as free hydroxyl groups. They may be formed by incomplete reaction of the aldehydes with polyvinyl alcohol, the reaction occurring simultaneously with or subsequent to the formation of the polyvinyl alcohol from polyvinyl esters. Particularly valuable resins of this type include those made from polyvinyl alcohol or esters which have average molecular weights of at least 7,000, and preferably in excess of 25,000, the molecular weight being calculated by means of Staudinger's formula from viscosity determinations on solutions of the materials. The aldehyde reactant is preferably an aliphatic saturated unbranched-chain compound having from two to six carbon atoms in the molecule, and the degree of acetalization (that is, the proportion of polyvinyl alcohol hydroxyl groups combined in acetal-type linkage) most desirable is within the range of 33% to 94%. Specifically, polyvinyl partial acetal resins made in this manner from acetaldehyde, butyraldehyde, propionaldehyde, and valeraldehyde, with the degree of acetalization varying inversely with the molecular weight of the aldehyde used, are especially suitable for the purpose of this invention. The actual preparation of these resins may follow methods heretofore disclosed. In solubility, the polyvinyl partial acetal resins differ distinctly from the conjoint polymers of vinyl esters, and while they are soluble generally in alcohols and alcohol-water mixtures, they show little or no solubility in ketones, esters and hydrocarbons.

Modification in filler characteristics which can be made by this method of lacquer coating are numerous, a few of which are represented by the following examples, showing also the manner of improving fillers heretofore of little value in vinyl resin plastics. In all the examples the vinyl resin forming the predominating resin component of the plastic is the product of the conjoint polymerization of vinyl chloride with vinyl acetate which contains about 80% to 90% by weight of vinyl chloride in the polymer. The polyvinyl partial acetal resin is one formed by acetalization to about 60% to 70% with butyraldehyde in the manner above described.

Example 1

Mica and certain grades of talc have a particle shape of flake-like character which is especially desirable in paints and lacquers, but in the lower grades of these materials poor color, impurities in the particles, or their translucency, may detract from their use as satisfactory fillers. A green paint filler or pigment was prepared from a mica base of poor color quality by treating the filler in the manner of this invention. To 264 grams of mica there was added a mixture of 36 grams of whiting (calcium carbonate), 96 c. c. of a 12.5% solution of polyvinyl partial acetal resin in methanol, and 37.5 c. c. of a 1% solution of "Brilliant Green crystals." After complete coating of the mica particles was effected, the mixture was dried, and a flaky green pigment of good color was obtained. This material functioned excellently as a filler for the conjointly polymerized vinyl chloride and vinyl acetate when milled therein in proportions of 60 parts of the filler to 40 parts of the resin. The color was permanent and was not subject to bleeding.

Example 2

The particle size of a filler influences and alters the effect produced thereby in a plastic composition, and to obtain desired results it may be advisable to coat a relatively coarse pigment with one much finer. In the above example, the finer whiting covers the coarser mica base, presenting the desirable appearance in the plastic of a finely-divided filler. In another test the coloring agent was omitted, and 200 grams of a brown mica flake was lacquered with a mixture of 50 grams of whiting and 150 c. c. of a 12.5% solution of polyvinyl partial acetal resin. After drying, 180 grams of this material were milled into 120 grams of a vinyl resin made by conjoint polymerization of vinyl chloride with vinyl acetate, and a much lighter plastic mix was obtained than one containing the same percentages of mica and whiting which had not been given the lacquer coating of polyvinyl partial acetal resin.

By this process the coarser base filler employed is usually one of opaque or semi-opaque properties. This permits the use in the lacquer coating of filler materials more finely divided than those ordinarily employed, with the improved results commonly associated with fillers of the finer particle size. A comparison was made of a whiting filler known as "Bradley-Vrooman Whiting 2000" and a colloidal calcium carbonate of finer particle size having the trade name "Calcene". When used individually in a vinyl resin plastic, the latter material had less covering power than the former. Employing the "Calcene," however, in the same percentages but applying it in a polyvinyl partial acetal resin lacquer on a mica base, a plastic mix was obtained which was noticeably whiter than either of those employing the individual filler in the absence of the treatment of this invention.

In a further modification of this phase of the invention, it may be desirable to blend two or more secondary fillers before lacquer coating the base filler material. It was found, for example, that a mixture of 3 parts of whiting to 1 part of titanium dioxide applied in a polyvinyl partial acetal resin lacquer to 16 parts of a mica base filler produced a much whiter vinyl resin mix than the same ingredients milled into an identical resin without the lacquering operation.

Example 3

Colored fillers, or pigments, are usually definitely colored compounds, mixtures of these with inert material, or they are lakes made by precipitating a dye upon a suitable base. Only certain types of dyes are suitable for lakes and the base upon which the dyes are precipitated must be chosen carefully. Due largely to the vehicles employed in vinyl resin plastics and lacquers, the field of suitable coloring pigments in these resins is further limited. By the lacquering method almost any color may be used on a wide variety of base materials, and dyes are made available for vinyl resin coloring which were heretofore of no value in this capacity. Example 1 represents the making of a green pigment material well adapted for use in vinyl resin paints, lacquers and plastics. In another test a dye practically insoluble in conjoint vinyl resin compositions was used to give good color in a filled resin mix. An asbestos fiber filler, in an amount 16% by weight, and 0.83% of a pink dye known as "Erie Pink" was milled with a vinyl ester resin. The resulting mix was practically uncolored, whereas the same dye dissolved in a methanol solution of polyvinyl partial acetal resin and applied to the asbestos filler, provided a coated filler material which imparted very good pink coloring to a similar vinyl resin mix.

To improve color stability of the resin mix, light stabilizing materials may be used, if desired, in the colored lacquer coating. In this manner the stabilizer becomes intimately dispersed in the final resin composition, but is concentrated at points where it is most effective, thus requiring smaller quantities of the stabilizer than would normally be necessary. As shown above, the colored lacquer coating may be applied without a secondary filler, but if a dark colored base filler is used a secondary colored filler can be added to the polyvinyl partial acetal resin solution, or a white opaque filler similar to titanium dioxide or whiting may be found appropriate.

*Example 4*

Certain types of filler materials which in physical characteristics may be quite suitable in plastic compositions often contain impurities which have a deleterious effect upon the vehicle of a paint or lacquer, or in vinyl resin plastic compositions they may promote resin deterioration. Impurities in fillers heretofore of little use in plastics are, by this invention, rendered innocuous, and the lacquer coated filler shows no adverse effect when compounded with vinyl resin. A well-known grade of asbestos fiber filler was compounded with vinyl ester resin in the amount of 45% by weight of the resin. A film of this plastic when heated to 135° C. deteriorated by showing a definite darkening in 3/4 hour. A similar mix in which the asbestos filler was lacquer coated with about 4.8% by weight of polyvinyl partial acetal resin showed less darkening in 2 3/4 hours at the same temperature than plastic compositions containing the uncoated filler. This improvement was still more pronounced when whiting was used along with the asbestos fiber filler. For example, a resin composition containing 45% by weight of a mixture of 2 parts asbestos fiber and 1 part of whiting without lacquer treating developed a darker color in 3/4 hour than resulted after 5 hours heating of a similar composition in which the filler mixture was first treated with 4.7% by weight of polyvinyl partial acetal resin. In this example, as in the one above, addition agents in the nature of heat stabilizers can be used along with the resin in the filler lacquering composition, and materials such as the stearates and oleates of lead, calcium, cadmium and strontium are useful in this capacity in the compounding of vinyl ester resin plastics.

Various modifications in this invention are shown in the above examples, and many others will be evident to those skilled in the art. Filler properties can be appreciably altered and modified both by means of a secondary pigment in the filler lacquer and other modifying agents, such as plasticizers, materials which influence the wetting of the base pigment, stabilizers for light and heat, and other compounds adapted to improve the inherent physical properties of the filler, and the stability of a plastic containing the treated filler against weathering, abrasion and wear. Such modifications are contemplated by the invention as defined in the appended claims.

In both the specification and claims reference to plastic compositions broadly is intended to include paints, lacquers and other coating compositions, as well as the usual molding, extrusion and calendering materials, and where no distinction is made between them, fillers and pigments are considered equivalent substances.

I claim:

1. A vinyl ester resin plastic composition containing a filler material the individual particles of which have an initial surface coating thereon of a film essentially composed of a polyvinyl partial acetal resin.

2. A plastic composition composed essentially of a vinyl resin substantially identical with a resin resulting from the conjoint polymerization of a vinyl halide with a vinyl ester of a lower aliphatic acid, and containing a filler material, the individual particles of which have a surface coating thereon of a film essentially composed of a polyvinyl partial acetal resin.

3. A plastic composition composed essentially of a vinyl resin substantially identical with a resin resulting from the conjoint polymerization of a vinyl halide with a vinyl ester of a lower aliphatic acid, and containing a filler material, the individual particles of which have a surface coating thereon of a film composed essentially of a polyvinyl partial acetal resin acetalized from about 33% to 94% with an aliphatic straight chain aldehyde of from 2 to 6 carbon atoms.

4. A plastic composition composed essentially of a vinyl resin substantially identical with a resin resulting from the conjoint polymerization of vinyl chloride with vinyl acetate and having about 80% to 90% vinyl chloride in the conjoint polymer, and a filler material the individual particles of which have a surface coating thereon of a film composed essentially of a polyvinyl partial acetal resin acetalized with butyraldehyde.

5. A filler material for vinyl ester resin plastic compositions pretreated to modify and improve its inherent characteristics by having the individual particles of said material coated with a thin lacquer-like surface film consisting essentially of a polyvinyl partial acetal resin, said film being further characterized by its insolubility in plastic compositions with which the filler is adapted to be subsequently incorporated.

6. A filler material for vinyl ester resin plastic compositions pretreated to modify and improve its inherent characteristics by having the individual particles of said material coated with a thin lacquer-like surface film consisting essentially of a polyvinyl partial acetal resin acetalized from about 33% to 94% with an aliphatic straight chain aldehyde of from 2 to 6 carbon atoms, said film being further characterized by its insolubility in plastic compositions with which the filler is adapted to be subsequently incorporated.

7. A filler material for vinyl ester resin plastic compositions pretreated to modify and improve its inherent characteristics by having the individual particles of said material coated with a thin lacquer-like surface film consisting essentially of a polyvinyl partial acetal resin acetalized with butyraldehyde, said film being further characterized by its insolubility in plastic compositions with which the filler is adapted to be subsequently incorporated.

VICTOR YNGVE.